United States Patent [19]
Chen et al.

[11] Patent Number: 5,232,471
[45] Date of Patent: Aug. 3, 1993

[54] MEMBRANES FORMED FROM NITRATED POLYARYLATES

[75] Inventors: Ning Chen, Piscataway, N.J.; Chao-Fong Tien, Macungie; Stephanie M. Patton, Bethlehem, both of Pa.

[73] Assignee: Air Products and Chemicals, Inc., Allentown, Pa.

[21] Appl. No.: 883,316

[22] Filed: May 13, 1992

[51] Int. Cl.$^5$ ............... B01D 53/22; B01D 71/58; B01D 71/61

[52] U.S. Cl. ............... 55/16; 55/68; 55/158

[58] Field of Search ............... 55/16, 68, 158; 210/500.39

[56] References Cited

U.S. PATENT DOCUMENTS

| | | | |
|---|---|---|---|
| Re. 30,351 | 7/1980 | Hoehn et al. | 55/16 |
| 3,822,202 | 7/1974 | Hoehn | 55/16 |
| 3,899,309 | 8/1975 | Hoehn et al. | 55/16 |
| 4,378,400 | 3/1983 | Makino et al. | 428/220 |
| 4,705,540 | 11/1987 | Hayes | 55/16 |
| 4,717,393 | 1/1988 | Hayes | 55/16 |
| 4,717,394 | 1/1988 | Hayes | 55/16 |
| 4,840,646 | 6/1989 | Anand et al. | 55/16 |
| 4,897,092 | 1/1990 | Burgoyne, Jr. et al. | 55/16 |
| 4,968,331 | 11/1990 | Sakashita et al. | 55/158 |
| 4,981,497 | 1/1991 | Hayes | 55/16 |
| 5,007,945 | 4/1991 | Tien et al. | 55/16 |
| 5,009,679 | 4/1991 | Angus et al. | 55/158 X |
| 5,013,332 | 5/1991 | Surnamer et al. | 55/16 |
| 5,049,169 | 9/1991 | Teramoto et al. | 55/16 X |
| 5,055,114 | 10/1991 | Kawakami et al. | 55/16 |
| 5,073,176 | 12/1991 | Arthur | 55/16 |
| 5,080,698 | 1/1992 | Krizan | 55/16 X |
| 5,082,565 | 1/1992 | Haubs et al. | 55/16 X |
| 5,112,941 | 5/1992 | Kasai et al. | 55/16 X |
| 5,116,504 | 5/1992 | Sakashita et al. | 55/16 X |

FOREIGN PATENT DOCUMENTS

| | | |
|---|---|---|
| 0244126 | 11/1987 | European Pat. Off. |
| 63-190607 | 8/1988 | Japan |
| 63-278524 | 11/1988 | Japan |
| 1-194904 | 8/1989 | Japan |
| 1-194905 | 8/1989 | Japan |

OTHER PUBLICATIONS

Kim, et al., "Reverse Permselectivity of $N_2$ over $CH_4$ in Aromatic Polyimides," J. Appl. Pol. Sci., 34, 1767–1771 (1987).

M. Salame, "Prediction of Gas Barrier Properties of High Polymers," Poly. Eng. Sci., vol. 26, pp. 1543–1546, No. 22, (1986).

N. Muruganandam, et al, "Gas Sorption and Transport in Substituted Polycarbonates," J. Polym. Sci.: Part B; Polym. Phy., vol. 25, 1999–2026, (1987).

*Primary Examiner*—Robert Spitzer
*Attorney, Agent, or Firm*—Mark L. Rodgers; William F. Marsh; James C. Simmons

[57] ABSTRACT

Polymeric membranes derived from aromatic polyarylates formed from nitrated dicarboxylic acid chlorides and cardo bisphenol having halo-substituents on all portions ortho to the hydroxyl groups are provided which exhibit high gas permselectivities.

8 Claims, No Drawings

MEMBRANES FORMED FROM NITRATED POLYARYLATES

FIELD OF THE INVENTION

The present invention relates to polymeric membranes, and in particular to membranes formed from polyarylates for gas separation applications.

BACKGROUND OF THE INVENTION

There is a need for improved polymeric materials that are highly permeable, yet may under certain circumstances, provide selective separation of various gas combinations. Such materials would especially be useful in commercial, non-cryogenic gas separation processes.

The commercial application for gas separation devices based on polymeric materials relies, in part, on maximizing the overall gas flux through the membrane. P. H. Kim, et al., J. Appl. Poly. Sci., 34 1761 (1987), reported that the gas flux for a membrane is relatable to the average space between the polymer chains. In addition, they indicated that the density of the polymer is also related to the overall gas flux. The problem, in part, for these commercial applications is to identify polymers with very high flux and with good thermomechanical properties. It has generally been observed that to achieve high overall flux requires having a polymer with low chain-chain interactions. This can be exemplified by polymers such as poly(dimethylsiloxane) or poly(4-methyl-1-pentene). These materials have rather high gas flux values. These high flux materials have, because of their low chain-chain interaction, low glass transition temperatures (Tg). As a consequence, these materials require either special processing conditions to build in chemical and physiochemical crosslinking or they can be used only at rather low application temperatures. By contrast, polymers with strong chain-chain interactions have rather high Tg values and have usually exhibited rather low gas flux.

U.S. Pat. Nos. 3,822,202 and 3,899,309; Re 30,351 (1980), disclose a process for separating fluids using a semi-permeable membrane made from polyimides, polyesters or polyamides. The repeating units of the main polymer chain of these membranes are distinguished in that such repeating units have at least one rigid divalent subunit, the two main chain single bonds extending from which are not collinear, is sterically unable to rotate 360° around at least one of these bonds, and has 50% or more of its main chain atoms as members of aromatic rings.

U.S. Pat. No. 4,705,540 discloses a highly permeable aromatic polyimide gas separation membrane and processes for using said membrane. The membrane is an aromatic polyimide membrane in which the phenylenediamines are rigid and are substituted on essentially all of the positions ortho to the amino substituents, and the acid anhydride groups are essentially all attached to rigid aromatic moieties.

U.S. Pat. Nos. 4,717,393 and 4,717,394 disclose polymeric membranes and processes using the membranes for separating components of a gas mixture. The membranes disclosed in both of these patents are semi-flexible, aromatic polyimides, prepared by polycondensation of dianhydrides with phenylenediamines having alkyl substituents on all ortho positions to the amine functions, or with mixtures of other, non-alkylated diamines, some components have substituents on all positions ortho to the amine functions. It is taught that the membranes formed from this class of polyimides exhibit improved environmental stability and gas permeability, due to the optimization of the molecular free volume in the polymer.

U.S. Pat. No. 4,378,400 discloses gas separation membranes formed from aromatic polyimides based upon biphenyltetra-carboxylic dianhydride for separating various mixtures. Japanese Patent Application 1-194905 discloses gas separation membranes formed from various polyimides and Japanese Patent Applicaitons 63-190607 and 63-278524 disclose gas separation membranes formed from various polyamides. Japanese Patent Application 1-194904 discloses gas separation membranes formed from polyarylates having hydrogen, methyl, or ethyl groups on all positions ortho to the hydroxy functions. Such membranes are reported to have $O_2/N_2$ selectivities from 1.7 to 2.5.

U.S. Pat. No. 4,840,646 and related E. P. Application 87303339.3 disclose tetrabromo bisphenol based polyestercarbonate membranes. The bisphenols contain linking groups selected form —C=O—, —$SO_2$—, and —O—.

M. Salame in Poly. Eng. Sci., 26 1543 (1986) developed a predictive relationship for oxygen permeability coefficient [($PO_2$)] and polymer structure. In the publication he demonstrates the group contributions of structural portions of a polymer to $P(O_2)$ values. In particular he indicates the presence of an aromatic group; i.e. phenyl, in place of methylene decreases the $P(O_2)$ values for a pair of comparative polymers.

N. Muruganandam, et al., J. Polym. Phy. 25, 1999 (1987) described the effects of alkylated and halogenated polymer material on oxygen and nitrogen permeability and permselectivity. Their results indicated that controlling the polymeric chain-chain packing and intramolecular torsional mobility can improve the performance of polymeric membranes U.S. Pat. Nos. 5,007,945 and 5,013,332 disclose a class of polymeric membranes formed from aromatic polyarylates derived from dicarboxylic acid chlorides and cardo or cyclohexyl bisphenols, respectively, having halo or methyl substituents on all positions ortho to the hydroxy functions.

SUMMARY OF THE INVENTION

The present invention is a class of polyarylate membranes which exhibit superior gas separation properties, especially for the separation of nitrogen and oxygen from a feed stream containing both components. The membranes of the present invention are nitrated aromatic polyesters prepared by condensation of nitrated diacid chlorides with bisphenols having four halogen substituents ortho to the hydroxyl groups and having a cycloalkyl or multicycloalkyl bridging group.

It has been found that the presence of aromatic nitrated dicarboxylic acid chlorides in the polymer chain impart improved gas separation properties to membranes formed from these materials

DETAILED DESCRIPTION OF THE INVENTION

We have found that the gas separation properties of membranes formed from aromatic polyarylates can be improved by the incorporation of a nitro group on the diacid chloride portion of the polymer structure which forms the membrane Specifically, the membranes of the present invention are formed from nitrated polyesters prepared by condensation of nitrated diacid chlorides with bisphenols having four halogen substituents ortho to the hydroxyl groups and having a cycloalkyl or multicycloalkyl bridging group. The polyarylates from which these membranes can be formed are made up of repeating represented by the structural formula:

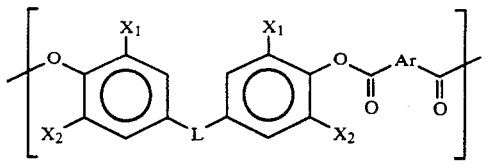

wherein each $X_1$ and $X_2$ are independently halo groups, L is a $C_5$-$C_{20}$ cycloalkyl or multicycloalkyl bridging group, and Ar is

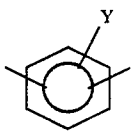

wherein Y is a nitro group.

Membranes formed from these polyarylates exhibit good has separation properties and are especially well suited for the separation of nitrogen and oxygen since the membranes exhibit both high permeabilities and excellent $O_2/N_2$ selectivities. Without being bound by theory, it is believed that the enhanced gas separation properties of these membranes is due to the intermolecular inductory interaction caused by secondary forces between polymeric chains as well as rigid intermolecular conformation. Additionally, the cyclic bridging groups adjust the chain-chain packing distance to insure a good permeability. The presence of the nitro group, preferably an $NO_2$ group, on the aromatic dicarboxylic acid chloride portion of the polymer results in higher selectivities for $O_2/N_2$ than with prior art polyarylates.

The bridging group (L) in the above formula can be any cycloalkyl or multicycloalkyl group which can be incorporated into the polyarylate structure, specific examples which include

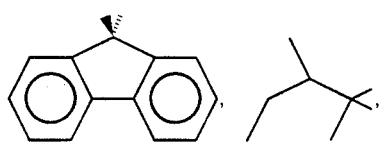

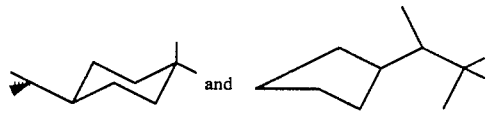

In addition to the above polyarylate structures, other monomer units, including other arylates, can be incorporated into the polymer structure which do not significantly affect the gas separation properties of the resultant membranes. The polyarylates of the present invention can be used to form membranes in any desired configuration known in the art, such as dense films, flat sheets, hollow fiber and the like.

As stated above the polyarylate membranes of the present invention are useful in a variety of gas separation applications, especially for the recovery of oxygen from an $O_2/N_2$ stream or from air. The gas mixture to be separated is simply brought into contact with the membrane whereby one or more components selectively permeates through the membrane.

The following examples are presented to better illustrate the present invention and are not meant to be limiting.

EXAMPLE 1

Thin film polyarylate membranes were made in accordance with the procedure set out below. These polyarylate membranes had the general structure:

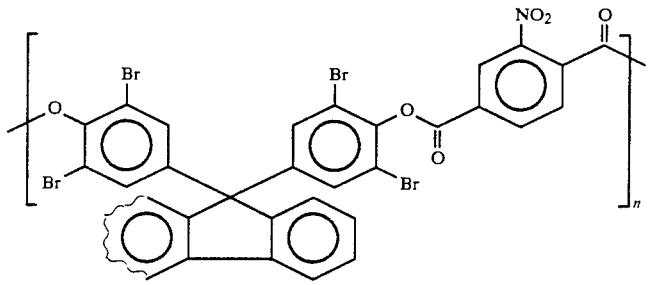

MONOMER PREPARATION

1) Preparation of 2-nitroterephthaloyl dichloride

A three neck, 500 mL round bottom flask, equipped with a reflux condenser topped with a calcium chloride drying tube and a mechanical stirrer, was charged with 2-nitroterephthalic diacid 25 g (0.118 mol) and 50.5 g of $PCl_5$. The solid mixture was stirred and heated by an oil bath to 105° C. After 5 minutes, the solid mixture was melted. The solution was refluxed for 3 hours. The generated $POCl_3$ was removed by atmosphere distillation through a short distilling column. The residues were distilled at reduced pressure to give a pale yellow liquid. This liquid was purified by one or more reduced pressure distillation, a pale yellow liquid (117° C./0.4 mmHg) was received and then used for polymerization (23.6 g, 80.6%).

2) Preparation of 9,9'-bis(2,6-dibromophenol)-fluorene

The 9,9'-bis (2,6-dibromophenol)-fluorene monomer was prepared in accordance with the procedures set out in U.S. Pat. No. 5,007,945.

POLYMER PREPARATION

To a three neck 500 mL round bottom flask equipped with a reflux condenser, a mechanical stirrer and a $N_2$ inlet tube, was charged 135 mL of deionized and degassed water, 0.86 g (21.4 mmol) of sodium hydroxide and 6.66 g (10 mmol) of 9,9'-bis(2,6-dibromophenol)-fluorene. The slurry was stirred until most of the bisphenol solid dissolved. Methylene chloride 10 mL was added to help to dissolve the residual bisphenols. Tetrabutylammonium bromide, 0.17 g (0.3 mmol), in 20 mL of methylene chloride and 2- nitroterephthaloyl dichloride 2.48 g (10 mmol) in 40 mL of methylene chloride were added in that sequence. The container was rinsed once with 30 mL of dry methylene chloride. Vigorous stirring was maintained for 40 min. A viscous organic solution was separated from the mixture after a 2 min settle down period and was washed once with a 1% HCl aqueous solution, once with deionized water and dripped into 2 L of methanol. The polymeric beads were left in the methanol overnight and filtered the next day. The air dried polymers were dissolved in 100 mL of methylene chloride and washed with 50 mL of deionized water. The methylene chloride solution was dripped into 2 L methanol. The purified polymeric beads were dried in vacuum oven at 100° C. for 12 h.

FILM TESTING

A 7% polymer solution was prepared in chloroform. The solution was filtered through a teflon filter to remove particles. The film was cast on a glass plate. Approximately 12 grams of solution was poured onto the glass plate in a 110 mm in. diameter glass ring. The solvent was allowed to evaporate off. The film was removed from the plate and dried in a vacuum oven at 150° C. for 24 hours.

The dried film was placed into a Dow Permeability Cell. A vacuum was pulled on one side and a nitrogen head was on the other. After three days of equilibrating the nitrogen permeability measurement was taken. The system was then purged with oxygen and allowed to equilibrate again before the oxygen measurement was taken. The results are as follows:

$PO_2 = 3.42$ barrers
$PN_2 = 0.51$ barrers
$\alpha O_2/N_2 = 6.73$

EXAMPLE 1(a) (COMPARATIVE)

The polymer preparation and film testing techniques set out above were also carried out to synthesize and test a polyarylate membrane having the same structural formula as above except that the polymer did not contain a nitro group on the dicarboxylic acid chloride. The $O_2/N_2$ selectivity of this membrane was measured as $\alpha O_2/N_2 = 6.0$ which is markedly lower than that for the polymer containing the nitro group.

EXAMPLE 2

Thin film polyarylate membranes were prepared in accordance with the procedure set out below. These polyarylate membranes had the general structure:

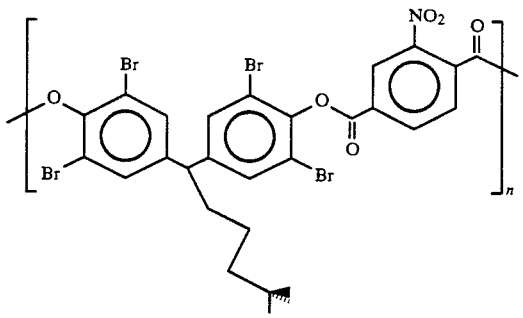

MONOMER PREPARATION 2-nitroterephthaloyl chloride monomer was prepared in accordance with the procedure set out in Example 1 above. Preparation of bis(2,6-dibromophenol)-4-t-butylcyclohexane was carried out in accordance with the procedure set out in U.S. Pat. No. 5,007,945.

POLYMER PREPARATION

To a three neck 500 mL round bottom flask equipped with a reflux condenser, a mechanical stirrer and a $N_2$ inlet tube, was charged 135 mL of deionized and degassed water, 0.86 g (21.4 mmol) of sodium hydroxide and 6.40 g (10 mmol) of bis(2,6-dibromophenol)-4-t-butylcyclohexane. The slurry was stirred until all the bisphenol solids dissolved. Tetrabutylammonium bromide, 0.17 g (0.3 mmol), in 20 mL of methylene chloride and 2-nitroterephthaloyl dichloride 2.48 g (10 mmol) in 40 mL of methylene chloride were added in that sequence. The container was rinsed once with 30 mL of dry methylene chloride. Vigorous stirring was maintained for 40 minutes. A viscous organic solution was separated from the mixture after 2 min settle down period and washed once with a 1% HCl aqueous solution, once with deionized water and dripped into 2 L of methanol. The air dried polymers were dissolved in 100 mL of methylene chloride and were washed with 50 mL of deion water. The methylene chloride solution was dripped into 2 L methanol. The purified polymeric beads were dried in vacuum oven at 100° C. for 12 h.

FILM TESTING

A 7% polymer solution was prepared in chloroform. The solution was filtered through a teflon filter to remove particles. The film was cast on a glass plate. Approximately 12 grams of solution was poured into the glass plate in a 100 mm in diameter glass ring. The solvent was allowed to evaporate off. The film was removed from the plate and dried in a vacuum oven at 150° C. for 24 hours.

The dried film was placed into a Dow Permeability Cell. A vacuum was pulled on one side and a nitrogen head was on the other. After three days of equilibrating the nitrogen permeability measurement was taken. The system was then purged with oxygen and allowed to equilibrate again before the oxygen measurement was taken. The results are as follows:

$PO_2 = 3.75$ barrers
$PN_2 = 0.59$ barrers
$\alpha O_2/N_2 = 6.34$

EXAMPLE 2(a) (COMPARATIVE)

The polymer preparation and film testing techniques set out in Example 2 above were also carried out to synthesize and test a polyarylate membrane having the same structural formula as that in Example 2 except that the polymer did not contain a nitro group on the dicarboxylic acid chloride. The $O_2/N_2$ selectivity of the membrane was measured as $\alpha O_2/N_2 = 5.5$ compared to a selectivity of 6.34 for the nitrated polymer.

EXAMPLE 3

Thin film polyarylate membranes were prepared in accordance with the procedure set out below. These polyarylate membranes had the general structure:

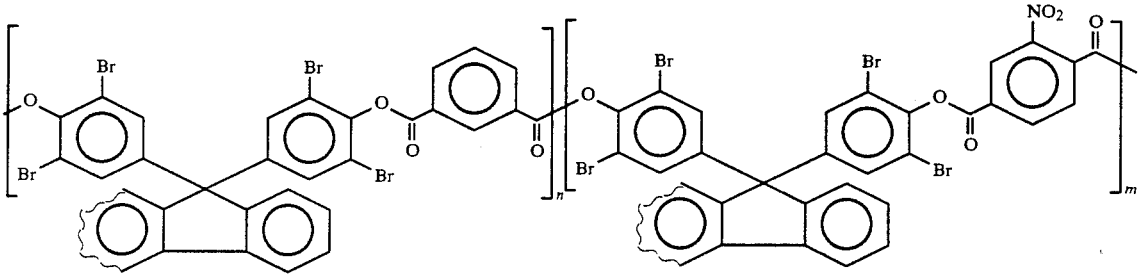

MONOMER PREPARATION 2-nitroterephthaloyl chloride was prepared in accordance with the procedure set out in EXAMPLE 1 above. Purification of commercially available isophthaloyl dichloride was carried out by crystallization in hexane, and preparation of 9,9'-bis(2,6-dibromophenol)-fluorene was carried out in accordance with the procedure set out in U.S. Pat. No. 5,007,945.

POLYMER PREPARATION

To a three neck 500 mL round bottom flask equipped with a reflux condenser, a mechanical stirrer and a $N_2$ inlet tube, was charged 135 mL of deionized and degassed water, 0.86 g (21.4 mmol) of sodium hydroxide and 6.66 g (10 mmol) of 9,9'-bis(2,6-dibromophenol)-fluorene. The slurry was stirred until all the bisphenol solids dissolved. Tetrabutylammonium bromide, 0.17 g (0.3 mmol), in 20 mL of methylene chloride and 2-nitroterephthaloyl dichloride 1.24 g (5 mmol) and isophathaloyl dichloride 1.015 g (5 mmol) in 40 mL of methylene chloride were added in that sequence. The container was rinsed once with 30 mL of dry methylene chloride. Vigorous stirring was maintained for 40 minutes. A viscous organic solution was separated from the mixture after 2 min settle down period and washed once with a 1% HCl aqueous solution, once with deionized water and dripped into 2 L of methanol. The polymeric beads were left in the methanol overnight and filtered the next day. The air dried polymers were dissolved in 100 mL of methylene chloride and were washed with 50 mL of deionized water. The methylene chloride solution was dripped into 2 L methanol. The purified polymeric beads were dried in vacuum oven at 100° C. for 12 h.

FILM TESTING

A 7% polymer solution was prepared in chloroform. The solution was filtered through a teflon filter to remove particles. The film was cast on a glass plate. Approximately 12 grams of solution was poured into the glass plate in a 100 mm in diameter glass ring. The solvent was allowed to evaporate off. The film was removed from the plate and dried in a vacuum oven at 150° C. for 24 hours.

The dried film was placed into a Dow Permeability Cell. A vacuum was pulled on one side and a nitrogen head was on the other. After three days of equilibrating the nitrogen permeability measurement was taken. The system was then purged with oxygen and allowed to equilibrate again before the oxygen measurement was taken. The results are as follows:

$PO_2 = 3.85$ barrers
$PN_2 = 0.57$ barrers
$\alpha O_2/N_2 = 6.81$

EXAMPLE 3(a) (COMPARATIVE)

The polymer preparation and film testing techniques set out in Example 3 above were also carried out to synthesize and test a membrane formed from a polyarylate copolymer having the same structural formula as that in Example 3 except that neither monomeric unit contained a nitro group on the dicarboxylic acid chloride. The $O_2/N_2$ selectivity of the membrane was measured as $\alpha O_2/N_2 = 6.6$ which was slightly lower than the 6.81 selectivity for the nitrated copolymer.

From the results of the above examples, it can be seen that the presence of a nitro group on the dicarboxylic acid chloride portion of the polyarylate increases the $O_2/N_2$ selectivity of membranes formed from such polyarylates. While all of the above examples were carried out using the terephthalate form of the polymer, similar results would also be expected for the isophthalate form of the polymer.

Having thus described the present invention, what is now deemed appropriate for Letters Patent is set out in the following claims.

We claim:

1. A semi-permeable membrane formed from a polyarylate containing polymerizable units of the formula:

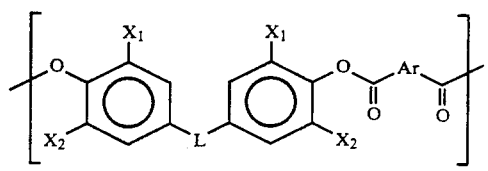

wherein $X_1$ and $X_2$ are independently halo substituents; L is a $C_5$-$C_{20}$ cycloalkyl or multi-cycloalkyl bridging group and Ar is

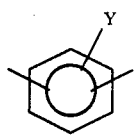

wherein Y is a nitro group.

2. A membrane in accordance with claim 1 wherein Y is NO$_2$.

3. A membrane in accordance with claim 2 wherein Ar is:

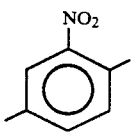

4. A membrane in accordance with claim 1 wherein both X$_1$ and X$_2$ are Br.

5. A membrane in accordance with claim 1 wherein L is selected from the group consisting of:

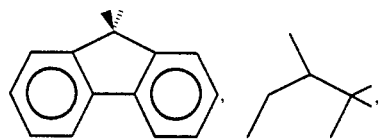

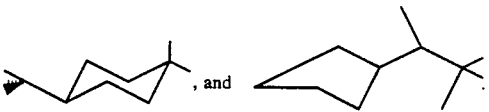

6. A process for separating a component of a gas mixture containing at least one other component, said process comprising: bringing said gas mixture into contact with the membrane of claim 1 which is selectively permeable toward one component of said gas mixture, whereby said component selectively permeates through said membrane from a feed side having both a higher partial pressure of said component and a higher total pressure to a permeate side having and a lower partial pressure of said component and a lower total pressure.

7. A process in accordance with claim 6 wherein the gas mixture is air and oxygen selectively permeates through the membrane.

8. A process in accordance with claim 7 wherein the gas mixture contains nitrogen and oxygen.

* * * * *